(12) United States Patent
Yee

(10) Patent No.: US 6,241,303 B1
(45) Date of Patent: Jun. 5, 2001

(54) METHOD AND APPARATUS FOR PROTECTING AN EXPOSED SURFACE OF A MOTOR VEHICLE FROM ADVERSE WEATHER

(76) Inventor: Man Lai Yee, 2872 Homeway Dr., Beavercreek, OH (US) 45434

( * ) Notice: Subject to any disclaimer, the term of this patent is extended or adjusted under 35 U.S.C. 154(b) by 0 days.

(21) Appl. No.: 09/166,982

(22) Filed: Oct. 6, 1998

(51) Int. Cl.[7] .................................................. B60J 3/00
(52) U.S. Cl. .................................... 296/95.1; 150/168
(58) Field of Search .............................. 296/95.1, 136; 150/166, 168; 160/370.21

(56) References Cited

U.S. PATENT DOCUMENTS

| | | |
|---|---|---|
| 2,223,145 | 11/1940 | Wise ........................ 296/84 |
| 2,646,118 | 7/1953 | Berty ....................... 160/369 |
| 2,807,356 * | 9/1957 | Blum ........................ 206/46 |
| 3,338,293 | 8/1967 | Hohmann ................ 160/368 |
| 4,257,464 | 3/1981 | Binney ....................... 150/52 |
| 4,635,993 | 1/1987 | Hooper et al. ............ 296/95 |
| 4,726,406 | 2/1988 | Weatherspoon .......... 296/95 |
| 4,867,216 * | 9/1989 | McKee .................... 150/166 |
| 4,973,098 | 11/1990 | McFall ................... 296/95.1 |
| 4,993,471 * | 2/1991 | Golden ................. 160/370.21 |
| 5,123,468 | 6/1992 | Mater, Jr. ............... 150/168 |
| 5,287,904 | 2/1994 | Smith et al. ............ 150/166 |
| 5,343,915 * | 9/1994 | Newsome ............... 150/166 |
| 5,364,155 | 11/1994 | Kuwahara et al. ...... 296/136 |
| 5,615,923 * | 4/1997 | Madison ................ 296/95.1 |
| 5,678,878 * | 10/1997 | Clark .................... 296/95.1 |
| 6,089,007 * | 7/2000 | Hamilton et al. .......... 57/14 |
| 6,093,469 * | 7/2000 | Callas ...................... 428/95 |

FOREIGN PATENT DOCUMENTS

| 674216 | 11/1963 | (CA) ............................ 296/88 |
|---|---|---|

\* cited by examiner

*Primary Examiner*—Joseph D. Pape
(74) *Attorney, Agent, or Firm*—Biebel & French

(57) ABSTRACT

A device for protecting a windshield of a motor vehicle against adverse weather comprises a cover so dimensioned to at least substantially cover the windshield and a plurality of straps extending from the cover for securing the cover against the windshield. A plurality of fibriles extend from a front side of the cover facing the windshield. In a preferred form, a waterproof backing material is adjoined along a back side of the cover opposite the fibrous side to display an image visible from the exterior of the motor vehicle. The cover is secured to the motor vehicle by engaging the hook and loop fastening material on the free ends of the straps with complementary fastening material in the interior of the motor vehicle.

8 Claims, 2 Drawing Sheets

METHOD AND APPARATUS FOR PROTECTING AN EXPOSED SURFACE OF A MOTOR VEHICLE FROM ADVERSE WEATHER

BACKGROUND OF THE INVENTION

1. Field of the Invention

This invention relates to the field of motor vehicle maintenance, and more particularly to weather protection devices for the windshields and other exposed surfaces of motor vehicles such as automobiles, trucks, boats and airplanes.

2. Description of the Related Art

Motor vehicles such as automobiles, trucks, boats and airplanes are commonly parked outdoors where they are exposed to adverse or potentially damaging weather conditions. Frost, fog, snow, sleet and dust can coat the windshield of such a motor vehicle and obscure the driver's view unless the windshield is scraped or brushed off before the vehicle is driven. Hail can pit, and in extreme cases, break the windshield. As a result, various covers have been proposed to protect the windshield from adverse weather conditions.

Among the materials proposed for use in such covers are waterproof canvas, waterproof cardboard or paper, and soft plastic materials such as nylon or vinyl. One drawback to covers made from these materials is that these materials are relatively thin and provide little impact protection for the windshield. Another drawback to covers made from such materials is that they tend to be relatively ineffective in protecting the windshield against coating by frost unless the covers are sealed along substantially their entire periphery.

SUMMARY OF THE INVENTION

These drawbacks and others are addressed by a device for protecting a windshield of a motor vehicle against adverse weather comprising a cover so dimensioned to at least substantially cover the windshield and a plurality of straps extending from the cover. The cover includes a plurality of fibriles extending from one of its sides. The device is used by positioning the cover over the exposed surface such that the side of the cover from which the fibriles extend faces the exposed surface of the windshield and securing the cover to the motor vehicle by means of the straps.

In a preferred form, hook and loop material is positioned at the free ends of the straps for engagement to secure free ends of the straps in the interior of the vehicle. In another preferred form, the cover is made up of natural or synthetic fir and a backing material is positioned along a back side of the cover opposite the fibrous side to display an image visible to the exterior of the motor vehicle.

One advantage of the preferred cover of the invention is that the contact of the fibrous material against the exposed surface of the windshield inhibits the icing of the windshield without the need to carefully seal the cover against the windshield along substantially its entire periphery. Another advantage of the preferred cover is that the fibriles cushions the windshield against impacts.

Therefore, it is one object of the invention to provide a cover for a windshield or other exposed surface which provides year-round protection against adverse weather conditions. These and other objects, features and advantages of the present invention will be described in further detail in connection with preferred embodiments of the invention shown in the accompanying drawings.

DETAILED DESCRIPTION OF THE PREFERRED EMBODIMENT

Figure 1:
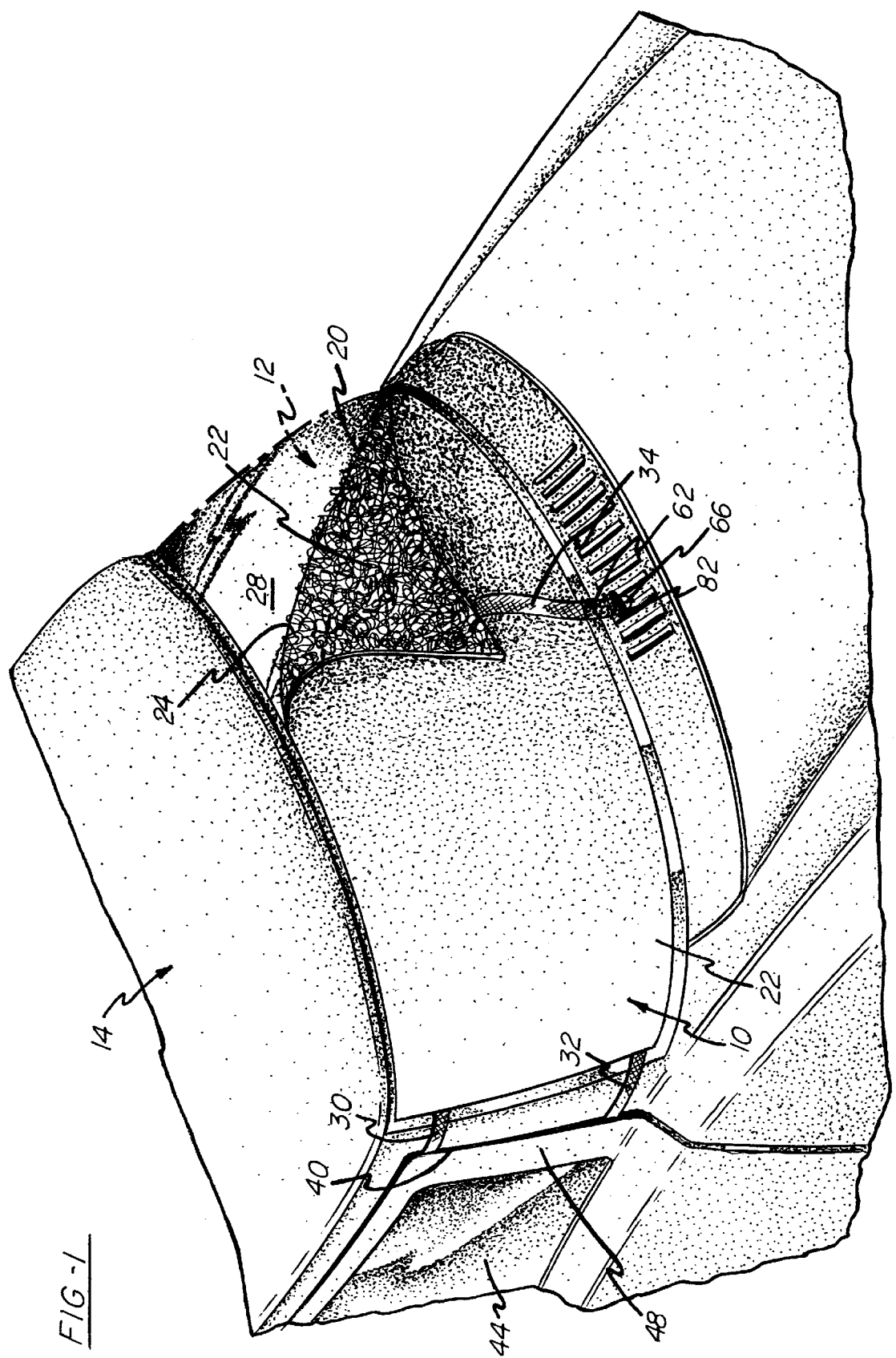
FIG. 1 is a perspective view showing a cover according to the present invention positioned over an automotive windshield.
Figure 2:
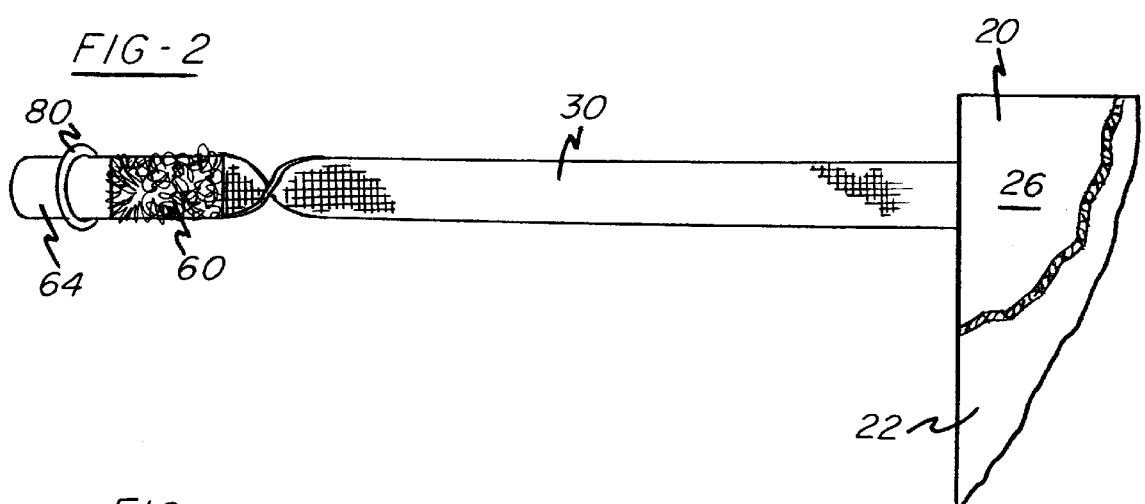
FIG. 2 is a partial elevational view showing a corner of the cover and a strap holding the cover in position over the windshield.

FIG. 1 is a perspective view showing a preferred windshield protection device 10 according to the present invention positioned over a windshield 12 of an automobile 14. The device 10 comprises a cover 20 and a backing sheet 22. The shape of the cover 20 corresponds approximately to the shape of the windshield 12 with the periphery of the cover 20 being slightly smaller than the periphery of the windshield 12. As best shown FIGS. 1 and 2, the cover 20 has a front side 24 (FIG. 1) from which a plurality of fibriles extend and a backing side 26 (FIG. 2). The front side 24 is positioned against an exposed surface 28 of the windshield 12. The backing sheet 22 adjoins the back side 26 of the cover 20.

While the cover 20 may be formed of any flexible material having a fibrous side, it is preferred that the cover 20 be composed of natural or synthetic fur. The backing sheet 22 is preferably formed of a waterproof plastic which is capable of being imprinted with a logo or image (not shown) visible from the exterior of the automobile 14. (While the device 10 has been shown with a backing sheet 22, the backing sheet 22 is not critical to the invention and may be omitted.)

Figure 3:
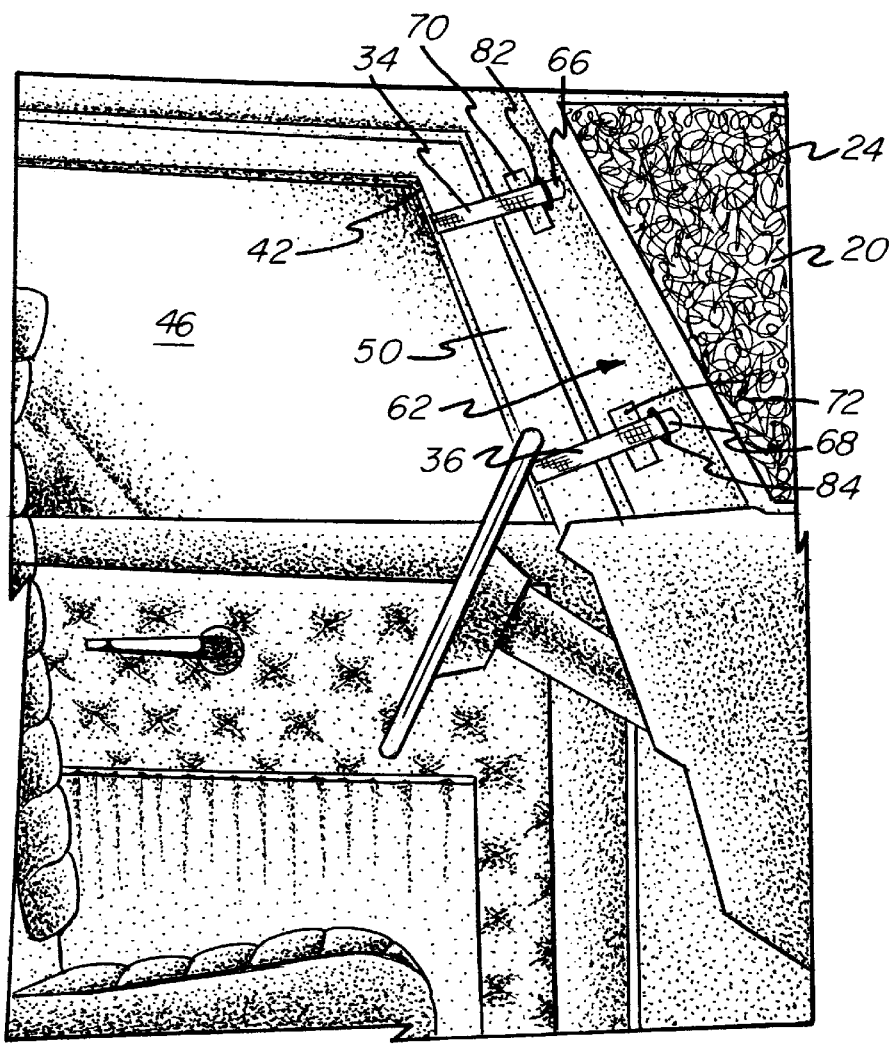
FIG. 3 is a partial elevational view of the interior of an automobile showing the straps engaging the door jam of the automobile with hook and loop fasteners.

As best shown in FIGS. 1 and 3, four straps 30, 32, 34, 36 extend from near the corners of the cover 20 into the interior of the automobile 14, as at 40 as shown in the area of an openings 40 and 42 (FIGS. 1 and 3), to hold the cover 10 in position over the windshield 12. Most preferably, the front side windows 44, 46 are cracked to provide the narrow opening 40,42 between the windows 44, 46 and the door jams 48, 50 to admit the straps 30, 32, 34, 36 into the interior of the automobile 14.

The straps 30, 32, 34, 36 each include a length of plastic hook material 60, 62 (FIGS. 1 and 2) positioned near the free ends 64, 66, 68 (only three shown in FIGS. 1 and 3) thereof for engaging strips of loop material 70, 72 (only two shown in FIG. 3) adhered to the inner surfaces 62 (only one shown in FIG. 3) of each door jamb 48, 50 of the automobile 14 to secure the cover 20 over the windshield 12. Plastic loops 80, 82, 84 (three shown in FIGS. 2 and 3) are coupled to the free ends 64, 66, 68 to deter theft of the device 10 by preventing the straps 30, 32, 34, 36 from being pulled loose from the loop material 70, 72 and through the openings 40, 42.

In use, the cover 20 is positioned over the windshield 12 with the side 24 of the cover 20 facing the exposed surface 28 of the windshield 12. The straps 30, 32, 34, 36 pass through the openings between the front side windows 44, 46 and the door jambs 48, 50 so as to engage with the loop material 70, 72 on the inner surfaces of the door jams 48, 50 to secure the cover 20 over the windshield 12. The engagement between the fibriles extending from the front side 24 of the cover 20 and the windshield 12 is sufficiently snug that the cover 20 will inhibit icing of the windshield 12 without the cover 20 being sealed around the periphery of the windshield 12. Furthermore, the fibriles cushion the windshield 12 against the impact of hail and the like.

Various changes or modifications in the invention described may occur to those skilled in the art without departing from the true spirit or scope of the invention For example, the cover 20 may be secured against the windshield 12 by any conventional means, such as suction cups (not shown) coupled to the cover 20 and directly adhered to the exposed surface 28 of the windshield 12. Furthermore, while the cover 20 has been described as being slightly smaller than the periphery of the windshield 12, the cover 20 may be equal to or slightly greater in size than the windshield without impairing the performance of the cover. The above description of preferred embodiments of the invention is intended to be illustrative and not limiting, and it is not intended that the invention be restricted thereto but that it be limited only by the true spirit and scope of the appended claims.

What is claimed is:

1. A method for protecting an exposed surface of a motor vehicle from adverse weather conditions, wherein the method comprises the steps of:

positioning a cover over the exposed surface, the cover including a flexible sheet member so dimensioned to at least substantially cover the exposed surface, the flexible sheet member defining a front surface facing the exposed surface, the flexible sheet member being selected from the group consisting of natural and synthetic fur including a plurality of fibriles extending from the front surface; and securing the cover to the motor vehicle.

2. The method as recited in claim 1 wherein the step of securing the cover to the motor vehicle includes securing straps extending from the cover to the motor vehicle.

3. The method as recited in claim 1, wherein the step of securing the cover to the motor vehicle includes engaging a first hook and loop fastening material on a strap extending from the cover with a second hook and loop material mounted on an interior surface of the motor vehicle.

4. A cover for positioning against an exposed surface of a motor vehicle comprising a flexible sheet member so dimensioned to at least substantially cover the exposed surface, the flexible sheet member defining a front side, the flexible sheet member being selected from the group consisting of natural and synthetic fur including a plurality of fibriles extending from the front side for facing the exposed surface when the cover is positioned, the cover including securing means for securing the cover against the exposed surface.

5. A cover for positioning against an exposed surface of a motor vehicle comprising a flexible sheet member so dimensioned to at least substantially cover the exposed surface, the flexible sheet member defining a front side, the flexible sheet member being selected from the group cosisting of natural and synthetic fur including a plurality of fibriles extending from the front side for facing the exposed surface when the cover is positioned, the cover including at least one strap extending from the cover for securing the cover against the exposed surface.

6. A cover for positioning against an exposed surface of a motor vehicle comprising a flexible sheet member so dimensioned to at least substantially cover the exposed surface, the flexible sheet member defining a front side, the flexible sheet member being selected from the group consisting of natural and synthetic fur including a plurality of fibriles extending from the front side for facing the exposed surface when the cover is positioned, the cover including at least one strap having a hook and loop fastening material near a free end for securing the cover against the exposed surface.

7. Apparatus for protecting a windshield of a motor vehicle against adverse weather comprising:

a cover so dimensioned to at least substantially cover the windshield;

the cover having a front side and a backing side;

the cover being selected from the group consisting of natural and synthetic fur including a plurality of fibriles extending from the front side;

a plurality of straps extending from the cover for securing the cover against the windshield such that the front side faces the windshield; and a plurality of hooks for engagement to secure free ends of the straps in the interior of the vehicle.

8. The apparatus as recited in claim 7 including a backing sheet adjoining the backing side of the cover, the backing sheet being formed of waterproof plastic.

* * * * *